United States Patent Office 3,494,946
Patented Feb. 10, 1970

3,494,946
FLUOROALKOXIDE DERIVATIVES OF THALLIUM(I)
James S. Skelcey, Midland, James E. Rumminger, Gladwin, and Kenneth O. Groves, Midland, Mich., assignors to The Dow Chemical Company, Midland, Mich., a corporation of Delaware
No Drawing. Continuation-in-part of application Ser. No. 685,967, Nov. 27, 1967. This application Nov. 29, 1968, Ser. No. 780,250
Int. Cl. C07f 5/00; C07c 31/34, 43/12
U.S. Cl. 260—429           4 Claims

ABSTRACT OF THE DISCLOSURE

The invention is novel thallium(I) polyfluoroalkoxides and a method for their preparation by reacting thallium(I) hydroxide and thallium(I) oxide with a polyfluoroalcohol.

---

This application is a continuation-in-part of co-pending application Ser. No. 685,967 filed Nov. 27, 1967 and now abandoned.

The invention herein described was made in the course of or under a contract with the Department of the Air Force.

SUMMARY

The present invention relates to fluorine containing metal alkoxides and more particularly is concerned with thallium(I) polyfluoroalkoxides and to a method of their preparation.

The novel compounds of the present invention correspond to the formula $$TlOR_f$$

wherein $R_f$ is a polyfluorinated straight or branched chain aliphatic group having a total of from 2 to about 11 carbon atoms, or a straight or branched chain polyfluorinated etherated aliphatic group having a total of from 2 to about 15 carbon atoms and being further characterized by containing 1 to about 5 ether linkages.

The compounds are either solids or, in some cases, liquids having a relatively high density at room temperature.

These fluoroalkoxide derivatives are suitable for use as herbicides and pesticides. Additionally, they find use as intermediates in the synthesis of other compounds in which a chloride, bromide or iodide ion is to be replaced by a fluoroalkoxy group. Further, the low melting compounds which are liquids at relatively low temperatures, because of their relatively high densities, can be used as flotation liquids, as for example in a gyroscope or accelerometer.

The present compounds in which the $R_f$ groups contain 1 or more ether linkages are preferred for use as flotation liquids in accelerometers due to their relatively low viscosities and high densities. The compounds in which the $R_f$ group is unetherated are preferred for use as flotation liquids in gyroscopes due to their relatively high viscosities and high densities.

In general, the compounds are prepared by reacting thallium(I) hydroxide (TlOH) or thallium(I) oxide ($Tl_2O$) with a fluoroalcohol of formula $HOR_f$, where $R_f$ is the same as set forth hereinbefore, using the fluoroalcohol in excess of that required stoichiometrically for formation of the alkoxide. The excess fluoroalcohol serves as a carrier liquid during the reaction. The corresponding thallium(I) fluoroalkoxide compound readily is separated and recovered from the reaction mass.

DESCRIPTION OF PREFERRED EMBODIMENTS

Preferred embodiments of the unetherated compounds of the present invention comprise thallium(I) polyfluoroalkoxides of formula $TlOR_f$ where $R_f$ is a highly fluorinated aliphatic radical containing from 2 to about 11 carbon atoms. The thallium polyfluoroalkoxides corresponding to the formula $TlOCH_2(CF_2)_nCF_2H$ where $n$ is an integer ranging from about 5 to about 9 are particularly preferred since these are relatively dense liquids at or slightly above room temperature.

Preferred embodiments of the etherated compounds of the present invention comprise thallium(I) polyfluoroalkoxides of formula $TlOR_f$ where $R_f$ is a highly fluorinated aliphatic radical containing 2 to about 15 carbon atoms and containing 1 to about 5 ether linkages. The etherated thallium(I) polyfluoroalkoxides containing 5 to about 12 carbon atoms and 1 to about 2 ether linkages are particularly preferred since they have relatively low viscosities and relatively low freezing points as well as relatively high densities at room temperature.

The compounds ordinarily are prepared by reacting with agitation a thallium source material, i.e. thallium(I) hydroxide or thallium(I) oxide, with a fluoroalcohol ($HOR_f$) in an inert substantially anhydrous atmosphere. Usually, the fluoroalcohol is employed in excess of that required stoichiometrically for reacting with the thallium(I) source material and is an amount sufficient to maintain the reaction mixture fluid during the reaction period. Alternatively, an inert carrier or diluent such as liquid aliphatic or aromatic hydrocarbons or halogenated hydrocarbons, for example, benzene, hexane, carbon tetrachloride and the like can be used. If a diluent is employed, about stoichiometric quantities of the thallium(I) reactant and fluoroalcohol preferably are used although an excess of either of these reactants does not detrimentally affect the reaction.

The quantities of excess fluoroalcohol or inert diluent to be used are not critical except that at a minimum the reaction mass must be sufficiently fluid to be readily agitated. The maximum amount of carrier ordinarily is selected so as to not require unduly large reactors and material handling equipment as well as to not provide an extremely dilute reaction mixture.

The reaction mixture is maintained at a temperature above the melting point of the fluoroalcohol and below about 80° C. for a period of from about 1 to about 72 hours. High yields of the thallium fluoroalkoxide products are readily obtained at room temperature, i.e. from about 18–25° C., with those fluoroalcohols which are liquid at this temperature, using a reaction time of from about 4 to about 48 hours.

After the reaction period, diluent, if employed, or excess fluoroalcohol is removed, as by low temperature evaporation, and the thallium polyfluoroalkoxide product dried under a low pressure, ordinarily at room temperature. The products directly as prepared and recovered are of a high purity. However, if desired the solid compounds can be further purified by recrystallization or other conventional purification techniques apparent to one skilled in the art.

The following examples will serve to further illustrate the present invention but are not meant to limit it thereto.

EXAMPLES (I) General preparation of unetherated thallium(I) polyfluoroalkoxides

A 100 milliliter round-bottom flask equipped with a magnetic stirrer was charged with a predetermined quantity of thallium hydroxide or thallium oxide and a stoichiometric excess of a fluoroalcohol. The flask was sealed and the contents stirred at room temperature for two days. After this period the reaction mixture was filtered under a substantially anhydrous nitrogen atmosphere and unreacted alcohol removed from the resulting filtrate by low pressure evaporation. The resulting thallium polyfluoroalkoxide product was further dried by pumping at a low absolute pressure ($\sim 0.1$ mm. Hg) at room temperature for 24 hours.

The product was recovered and its structure proved by elemental chemical analysis and infrared spectroscopy. A number of the compound's identifying characteristics also were determined.

(II) General preparation of etherated thallium(I) polyfluoroalkoxides

A 50 milliliter flask equipped with a magnetic stirrer was charged with a predetermined amount of thallium oxide and a stoichiometric excess of an etherated fluoroalcohol. The flask was stoppered and stirred at room temperature for three days. Unreacted thallium(I) oxide was filtered off under nitrogen and any excess alcohol removed by vacuum evaporation. The remaining product was then transferred to a molecular still and purified by distillation at an absolute pressure of about 0.001 mm. Hg.

In a similar manner, the reaction may be carried out using thallium(I) hydroxide in place of thallium(I) oxide.

In both cases the product was recovered and its structure proved by elemental chemical analysis and infrared spectroscopy. A number of the compound's identifying characteristics also were determined.

Table I summarizes the reactants and their concentrations to prepare a number of thallium polyfluoroalkoxide compounds following the procedures set forth directly hereinbefore.

Table II presents analytical data and property characteristics for these compounds.

In the two tables, corresponding example numbers refer to the same compound preparation.

TABLE I

| Run No. | Thallium source material | | | Fluoroalcohol reactant | | | Product |
|---|---|---|---|---|---|---|---|
| | Type | Grams | Mole | Type | Grams | Moles | |
| 1 | TlOH | 10 | 0.045 | Octafluoropentanol | 42 | 0.179 | Thallium octafluoropentoxide. |
| 2 | TlOH | 10 | 0.045 | Trifluoroethanol | 34 | 0.340 | Thallium trifluoroethoxide. |
| 3 | TlOH | 10 | 0.045 | Pentafluoropropanol | 30 | 0.200 | Thallium pentafluoropropoxide. |
| 4 | TlOH | 10 | 0.045 | Hexafluoroisopropanol | 36 | 0.214 | Thallium hexafluoroisopropoxide. |
| 5 | TlOH | 10 | 0.045 | Heptafluorobutanol | 41 | 0.205 | Thallium heptafluorobutoxide. |
| 6 | TlOH | 10 | 0.045 | Dodecafluoro-2-methyl-2-octanol | 33 | 0.092 | Thallium dodecafluoro-2-methyl-2-octoxide. |
| 7 | $Tl_2O$ | 50 | 0.225 | Dodecafluoroheptanol | 265 | 0.800 | Thallium dodecafluoroheptoxide. |
| 8[1] | $Tl_2O$ | 50 | 0.225 | Hexadecafluorononanol | 250 | 0.580 | Thallium hexadecafluorononoxide. |
| 9 | $Tl_2O$ | 50 | 0.225 | Pentadecafluorooctanol | 190 | 0.475 | Thallium pentadecafluorooctoxide. |
| 10[2] | TlOH | 10 | 0.045 | Hexafluoro-1,5-pentanediol | 20 | 0.094 | Thallium hexafluoro-1,5-pentanedioxide. |
| 11 | $Tl_2O$ | 11 | 0.05 | Perfluoro-1,1-dihydro-2,4-dimethyl-3-oxapentanol | 16 | 0.031 | Thallium perfluoro-1,1-dihydro-2,4-dimethyl-3-oxapentoxide. |
| 12 | $Tl_2O$ | 3.8 | 0.017 | Perfluoro-1,1-dihydro-2,5-dimethyl-3,6-dioxadecanol | 10 9 | 0.015 | Thallium perfluoro-1,1-dihydro-2,5-dimethyl-3,6-dioxadecoxide. |
| 13 | TlOH | 6 | 0.027 | Trichloromethylbis(trifluoromethyl)carbinol | 12 | 0.042 | Thallium trichloromethylbis(trifluoromethyl)methoxide. |

[1] Preparation carried out at 75° C. in order to liquefy fluoroalcohol reactant which melts at 60° C.
[2] Preparation carried out at 80° C. in order to liquefy fluoroalcohol reactant which melts at 78° C.

TABLE II

| Run No. | Product Name | Product Formula | Analysis, Wt. percent C Fd. | C Theo. | H Fd. | H Theo. | Tl Fd. | Tl Theo. | Melting point, °C | Boiling point, °C | Density, g./cc. | Viscosity centistokes at X° C. |
|---|---|---|---|---|---|---|---|---|---|---|---|---|
| 1 | Thallium octafluoropentoxide | TlOCH$_2$(CF$_2$)$_3$CF$_2$H | 13.72 | 13.79 | 0.70 | 0.69 | 46.80 | 46.93 | 89 | Vacuum sublimes at 110° C | | |
| 2 | Thallium trifluoroethoxide | TlOCH$_2$CF$_3$ | 8.01 | 7.91 | 0.68 | 0.66 | 66.30 | 67.37 | 134 | Vacuum sublimes at 50° C | | |
| 3 | Thallium pentafluoropropoxide | TlOCH$_2$C$_2$F$_5$ | 10.19 | 10.19 | 0.59 | 0.57 | 57.60 | 57.83 | 70 | ....do.... | | |
| 4 | Thallium hexafluoroisopropoxide | TlOCH(CF$_3$)$_2$ | 9.75 | 9.70 | 0.34 | 0.27 | 55.20 | 55.03 | 85 | Vacuum sublimes at 70° C | | |
| 5 | Thallium heptafluorobutoxide | TlOC$_3$F$_7$ | 11.95 | 11.91 | 0.60 | 0.50 | 50.65 | 50.66 | 73 | Vacuum sublimes at 60° C | | |
| 6 | Thallium dodecafluoro-2-methyl-2-octoxide | TlOC(CH$_3$)$_2$(CF$_3$)$_2$CF$_2$H | 19.18 | 19.18 | 1.23 | 1.25 | 35.70 | 36.27 | 79 | | | |
| 7 | Thallium dodecafluoroheptoxide | TlOCH$_2$(CF$_2$)$_5$CF$_2$H | 15.75 | 15.70 | 0.71 | 0.56 | 38.40 | 38.17 | 55-57 | 145/<0.001 mm. Hg | 2.526 at 25° C | {215.0 at 125.1° F. {149.3 at 135.3° F. |
| 8 | Thallium hexadecafluorononoxide | TlOCH$_2$(CF$_2$)$_7$CF$_2$H | 16.85 | 17.01 | 0.50 | 0.48 | 32.30 | 32.16 | | 150/<0.001 mm. Hg | 2.492 at 25° C | {315.3 at 125.1° F. {218.2 at 135.2° F. |
| 9 | Thallium pentadecafluorooctoxide | TlOCH$_2$(CF$_2$)$_6$CF$_3$ | 16.00 | 15.92 | 0.37 | 0.34 | 34.05 | 33.87 | | 175/<0.001 mm. Hg | 2.521 at 25° C | {159.2 at 125.2° F. {111.1 at 135.1° F. |
| 10 | Thallium hexafluoro-1,5-pentanedioxide | TlOCH$_2$(CF$_2$)$_3$CH$_2$OTl | 9.36 | 9.70 | 0.65 | 0.65 | 67.20 | 66.05 | (¹) | | | |
| 11 | Thallium perfluoro-1,1-dihydro-2,4-dimethyl-3-oxapentoxide | TlOCH$_2$CF(CF$_3$)OCF(CF$_3$)$_2$ | 13.74 | 13.87 | 0.39 | 0.39 | 39.75 | 39.34 | −28 | 95/<0.001 mm. Hg | 2.605 at 25° C | {47.1 at 125.1° F. {34.0 at 135.2° F. |
| 12 | Thallium perfluoro-1,1-dihydro-2,5-dimethyl-3,6-dioxadecoxide | TlOCH$_2$CF(CF$_3$)OCF$_2$CF(CF$_3$)OC$_4$F$_9$ | 16.50 | 16.33 | 0.38 | 0.25 | 27.40 | 27.79 | ∼−14 | 105/<0.001 mm. Hg | 2.328 at 25° C | |
| | | Chloride Analysis | | | | | | | | | | |
| 13 | Thallium trichloromethylbis(trifluoromethyl) methoxide | TlOC(CCl$_3$)(CF$_3$)$_2$ | 9.78 | 9.83 | 21.83 | 21.76 | 41.60 | 41.81 | 188-139 | Vacuum sublimes at 110° C | | |

¹ Decomposes above 200° C.

The compounds, except thallium hexafluoro-1,5-pentanedioxide, were soluble in benzene, acetone, diethyl ether and the fluoroalcohol reactant used in their preparation. Thallium hexafluoro-1,5-pentanedioxide is virtually insoluble in the above solvents. They are sensitive to moisture especially when in solution.

Infrared analysis of the novel compounds gave spectra which were consistent with the assigned structure.

These compounds are effective herbicides for a number of weeds and the like vegetation. Additionally, these compounds have insecticidal and parasiticidal activity.

Additionally, thallium dodecafluoroheptoxide, thallium hexadecafluorononoxide and thallium pentadecafluorooctoxide because of their low melting points and high densities have been shown to be suitable for use as stabilizing fluids for use in gyroscopes, for example. Thallium perfluoro-1,1-dihydro-2,4-dimethyl-3-oxapentoxide and thallium perfluoro-1,1-dihydro-2,5-dimethyl-3,6-dioxadecoxide are especially useful for use as flotation fluids in accelerometers due to their high densities and very low viscosities.

In a manner similar to that described in preceding general Example I, other unetherated thallium fluoroalkoxides can be prepared by reacting thallium(I) hydroxide or thallium(I) oxide with fluoroalcohols such as, for example, HOC(CF$_3$)$_3$, HOC(CF$_3$)$_2$(C$_2$F$_5$), $$HOC(CF_3)_2C(CF_3)_2OH$$

HOCH$_2$(CF$_2$)$_x$CF$_3$ where $x$ is an integer from 1 up to 6.

In a manner similiar to that described in preceding general Example II, other etherated thallium fluoroalkoxides can be prepared by reacting thallium(I) hydroxide or thallium(I) oxide with etherated fluoroalcohols such as, for example, HO(CH$_2$)$_x$OCF(CF$_3$)$_2$, $$HOCH_2CF(CF_3)O[CF_2CF(CF_3)O]_xC_4F_9$$

and $$HOCH_2CF(CF_3)O[CF_2CF(CF_3)O]_xCF(CF_3)_2$$

where $x$ is an integer from 1 to 3. The reaction of thallium(I) hydroxide or thallium(I) oxide with these fluoroalcohols will result in the formation of thallium(I) alkoxide corresponding to the formula TlOR$_f$ wherein R$_f$ is 1,1-dihydro-3-trifluoromethyl-2-oxabutyl, 1,1,2,2-tetrahydro-4-trifluoromethyl-3-oxapentyl, 1,1,2,2,3,3-hexahydro-5-trifluoromethyl-4-oxahexyl, perfluoro-1,1-dihydro-2,5,8-trimethyl-3,6,9-trioxadodecyl, perfluoro-1,1-dihydro-2,5,8,11-tetramethyl-3,6,9,12-tetraoxapentadecyl, perfluoro-1,1-dihydro-3,5,7-trimethyl-3,6-dioxanonyl, perfluoro-1,1-dihydro-2,5,8,10-tetramethyl-3,6,9-trioxadodecyl or perfluoro-1,1-dihydro-2,5,8,11-tetramethyl-3,6,9,12-tetraoxapentadecyl.

Various modifications can be made in the present invention wtihout departing from the spirit or scope thereof for it is understood that we limit ourselves only as defined in the appended claims.

We claim:
1. Thallium(I) polyfluoroalkoxides corresponding to the formula TlOR$_f$ where R$_f$ is:
   (a) a polyfluorinated straight or branched chain aliphatic group having a total of from 2 to about 11 carbon atoms, or
   (b) a straight or branched chain polyfluorinated etherated aliphatic group having a total of from 2 to about 15 carbon atoms and being further characterized by containing 1 to about 5 ether linkages.
2. The thallium polyfluoroalkoxides as defined in claim 1 (a) wherein R$_f$ is octafluoropentyl, trifluoroethyl, pentafluoropropyl, hexafluoroisopropyl, heptafluorobutyl, dodecafluoro-2-methyl-2-octyl, dodecafluoroheptyl, hexadecafluorononyl, pentadecafluorooctyl, 2,2,3,3,4,4-hexafluoropentylmethylene or trichloromethylbis(trifluoromethyl)methyl.

3. The polyfluorinated thallium(I) alkoxides as defined in claim 1 (b) wherein $R_f$ is perfluoro-1,1-dihydro-2,4-dimethyl-3-oxapentyl or perfluoro-1,1-dihydro-2,5-dimethyl-3,6-dioxadecyl.

4. The polyfluorinated thallium(I) alkoxides as defined in claim 1 wherein $R_f$ is 1,1-dihydro-3-trifluoromethyl-2-oxabutyl, 1,1,2,2 - tetrahydro-4-trifluoromethyl-3-oxapentyl, 1,1,2,2,3,3-hexahydro-5-trifluoromethyl - 4-oxahexyl, perfluoro-1,1-dihydro-2,5,8-trimethyl-3,6,9-trioxadodecyl, perfluoro-1,1-dihydro-2,5,8,11 - tetramethyl-3,6,9,12-tetraoxapentadecyl, perfluoro-1,1-dihydro - 3,5,7-trimethyl-3,6-dioxanonyl, perfluoro-1,1-dihydro-2,5,8,10-tetramethyl-3,6,9-trioxadodecyl, or perfluoro-1,1-dihydro-2,5,8,11-tetramethyl-3,6,9,12-tetraoxapentadecyl.

References Cited

UNITED STATES PATENTS 3,424,772  1/1969  Moshier _____ 260—429

OTHER REFERENCES

Menzies: J. Chem. Soc., 1931, pp. 1571-3.

TOBIAS E. LEVOW, Primary Examiner

A. P. DEMERS, Assistant Examiner

U.S. Cl. X.R.

74—5; 260—615, 633, 999